（12）United States Patent
Charrier et al.

(10) Patent No.: US 12,013,082 B2
(45) Date of Patent: Jun. 18, 2024

(54) METHOD FOR MONITORING A FLUID SYSTEM LUBRICATING A MECHANICAL SYSTEM

(71) Applicant: AIRBUS HELICOPTERS, Marignane (FR)

(72) Inventors: Mathieu Charrier, Marseilles (FR); Sylvain Berthalon, Velaux (FR); Jerome Belmonte, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 478 days.

(21) Appl. No.: 17/350,638

(22) Filed: Jun. 17, 2021

(65) Prior Publication Data

US 2022/0026020 A1    Jan. 27, 2022

(30) Foreign Application Priority Data

Jul. 21, 2020   (FR) ........................................ 2007657

(51) Int. Cl.
*F16N 29/04*   (2006.01)
*F16H 57/04*   (2010.01)

(52) U.S. Cl.
CPC ......... *F16N 29/04* (2013.01); *F16H 57/0442* (2013.01); *F16N 2210/08* (2013.01); *F16N 2210/12* (2013.01); *F16N 2260/02* (2013.01)

(58) Field of Classification Search
CPC ...... F16N 29/02; F16N 29/04; F16N 2210/08; F16N 2210/12; F16N 2260/02; F16N 2260/20; F16H 57/0442
See application file for complete search history.

(56) References Cited

U.S. PATENT DOCUMENTS 4,520,902 A  *  6/1985  Snow ...................... F16N 25/02
                                                              184/29
4,674,030 A  *  6/1987  Gabriel ................... F16N 29/04
                                                              700/79

(Continued)

FOREIGN PATENT DOCUMENTS

CN      111076072 A  *  4/2020  ............... F01M 9/10
EP      3109414 A1      12/2016

(Continued)

OTHER PUBLICATIONS

French Search Report for French Application No. FR2007657, Completed by the French Patent Office, Dated Mar. 2, 2021, 10 pages.

*Primary Examiner* — Minh Truong
(74) *Attorney, Agent, or Firm* — BROOKS KUSHMAN P.C.

(57) ABSTRACT

A method for monitoring a fluid system for lubricating a mechanical system. The fluid system comprises a spraying circuit connected to a main fluid circuit and to a back-up fluid circuit. The back-up fluid circuit comprises a back-up check valve closed in a nominal operating mode. The method comprises a monitoring phase comprising the generation of a first alert in the presence of the detection of a malfunction making the main fluid circuit inoperative and the back-up check valve in an open state and the generation of a second alert different from the first alert in the presence of a malfunction and the back-up check valve in a closed state.

15 Claims, 3 Drawing Sheets

(56) References Cited

U.S. PATENT DOCUMENTS

| | | | |
|---|---|---|---|
| 4,976,335 A | | 2/1990 | Cappellato |
| 5,121,815 A | | 6/1992 | Francois et al. |
| 5,239,861 A | * | 8/1993 | Fujita .................. B01D 35/143 |
| | | | 73/61.73 |
| 7,137,590 B2 | * | 11/2006 | Sandrart ................ B64C 27/12 |
| | | | 244/17.25 |
| 10,060,415 B2 | * | 8/2018 | Bogaert .................. F03D 80/70 |
| 10,711,877 B2 | * | 7/2020 | Fisher ................. F16H 57/0486 |
| 2005/0056490 A1 | | 3/2005 | Maret et al. |
| 2016/0305284 A1 | | 10/2016 | Mastro et al. |
| 2017/0175875 A1 | | 6/2017 | Lapeyre et al. |
| 2017/0284535 A1 | * | 10/2017 | Ehinger .................. B64C 27/14 |
| 2020/0248529 A1 | * | 8/2020 | Beason ............... E21B 43/2607 |

FOREIGN PATENT DOCUMENTS

| | | |
|---|---|---|
| EP | 3418192 A1 | 12/2018 |
| FR | 2658577 A1 | 8/1991 |
| FR | 2685758 A1 | 7/1993 |
| FR | 2826094 A1 | 12/2002 |
| FR | 3045764 A1 | 6/2017 |

* cited by examiner

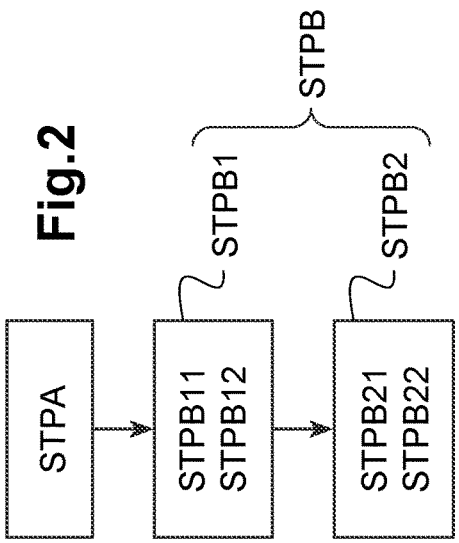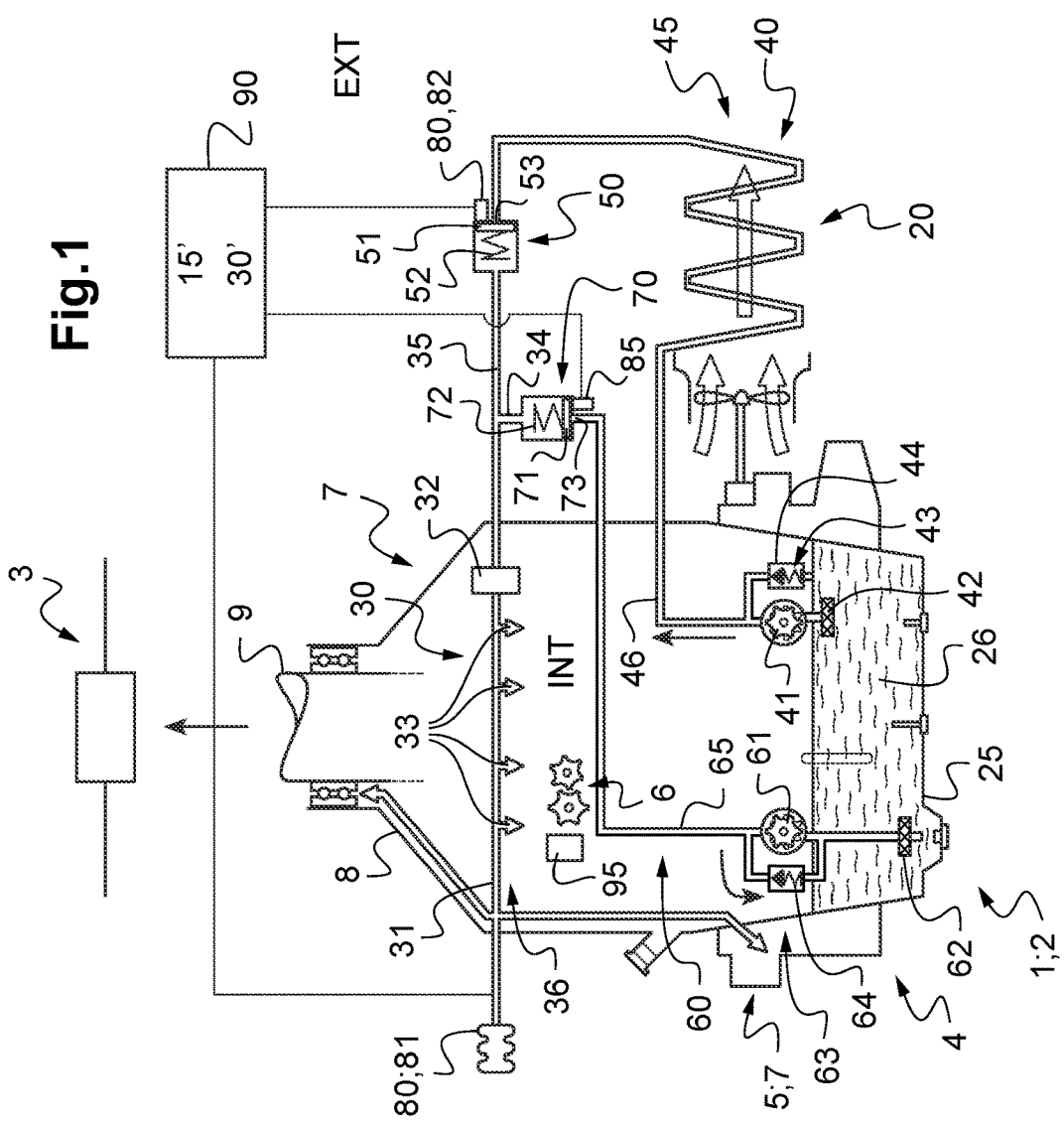

METHOD FOR MONITORING A FLUID SYSTEM LUBRICATING A MECHANICAL SYSTEM

CROSS REFERENCE TO RELATED APPLICATIONS

This application claims priority to French patent application No. FR 20 07657 filed on Jul. 21, 2020, the disclosure of which is incorporated in its entirety by reference herein.

TECHNICAL FIELD

The present disclosure relates to a method for monitoring a fluid system lubricating a mechanical system and, in particular, a gearbox of an aircraft. The disclosure also relates to such a fluid system, an assembly comprising a mechanical system and the fluid system, and a vehicle comprising this assembly.

BACKGROUND

The present disclosure relates to the field of lubricating and cooling mechanical systems and, in particular, gearboxes, in particular gearboxes intended for a rotary-wing aircraft.

A rotary-wing aircraft of the rotorcraft type comprises a rotor providing at least partial lift for this aircraft. In order to rotate such a rotor, a rotorcraft is equipped with a power plant comprising at least one engine. Moreover, a gearbox may be interposed between at least one engine and at least one rotor. A gearbox comprises moving elements. A fluid system makes it possible to lubricate contact areas of the moving elements and cool them.

According to a first technical solution, a fluid system comprises a single fluid circuit supplying a spraying circuit that may be referred to as a "lubrication manifold" or indeed as a "fluid spraying manifold". The spraying circuit comprises a pressure switch and one or more pipings opening on sprinklers of the nozzle or other type.

Though effective, such a fluid system is likely to have leaks.

According to a second technical solution, a fluid system may therefore comprise a main fluid circuit and a back-up fluid circuit. The main fluid circuit and the back-up fluid circuit are configured to draw oil from the same tank and to convey this oil to the same spraying circuit. The spraying circuit comprises sprinklers that spray the oil into the mechanical system at the various locations to be lubricated. Inside a gearbox, the tank may be arranged in the bottom of this gearbox in order for the oil sprayed by the spraying circuit to return to the tank by force of gravity.

The main fluid circuit comprises a main pump comprising a suction inlet submerged in the tank. The pump is connected to at least one heat exchanger via a first main hydraulic line. The heat exchanger is located outside the mechanical system to be lubricated. Moreover, this heat exchanger is connected to the spraying circuit via a second main hydraulic line. The second main hydraulic line comprises a main check valve upstream of the spraying circuit and a main pressure switch. A main discharge line provided with a pressure relief valve may be in fluid communication with the first main hydraulic line and the tank.

The secondary fluid circuit has no heat exchanger. The secondary fluid circuit includes a secondary pump provided with a secondary suction inlet drawing oil from the tank more deeply than the main pump of the main fluid circuit. The secondary pump is connected to a secondary hydraulic line opening on the spraying circuit downstream of the second main hydraulic line and outside the mechanical system to be lubricated. The secondary hydraulic line comprises a back-up check valve upstream of the spraying circuit and a secondary pressure switch. A secondary discharge line provided with a pressure relief valve may be in fluid communication with the secondary hydraulic line and the tank.

The main pump and the secondary pump are dimensioned such that the back-up check valve is closed in a nominal operating mode.

During this nominal operating mode, the main pump draws oil from the tank via its suction inlet, then propels it into the first main hydraulic line. This oil is cooled in the heat exchanger or exchangers and is then conveyed towards the sprinklers. The sprinklers then spray the oil onto the moving elements in order to cool and lubricate them. The oil then falls back into the tank by force of gravity.

The secondary pump also draws oil from the tank. However, the back-up check valve is closed under the effect of the pressure of the oil from the main fluid circuit. The oil drawn by the secondary pump thus returns into the tank via the secondary discharge line.

In the event of a hydraulic leak out of the casing, the oil level in the tank drops. When this oil level drops below the suction inlet of the main pump, the main pump no longer draws in oil. The spraying circuit is then supplied with oil by the back-up fluid circuit.

The operation of the fluid system is monitored using various pressure switches.

Such a fluid system is advantageous because it allows the tank and the spraying circuit to be combined. However, only using pressure switches to monitor the fluid system is challenging.

Indeed, the pressure variations in the fluid system can be small and difficult to detect with pressure switches, depending on the accuracy of these pressure switches. In this case, it is not possible to distinguish between a scenario in which the secondary suction pump is supplying a very small amount of oil to the sprinklers from a scenario in which the secondary suction pump is only drawing in air.

Document FR 2 685 758 describes a gearbox that has a fluid system provided with a back-up fluid circuit separate from a main fluid circuit. This back-up fluid circuit comprises its own tank for supplying a back-up nozzle via an actuator. This actuator may comprise a valve or a pump cooperating with an oil pressure sensor arranged in the main fluid circuit or with a temperature sensor arranged on a casing of the gearbox.

Document FR 2 826 094 also describes an alternative system provided with a pressure sensor measuring a pressure inside the main fluid circuit.

Document FR 2 658 577 describes a fluid system provided with a main fluid circuit having a main tank and a back-up fluid circuit provided with a by-pass duct. The by-pass duct is connected to the main fluid circuit and opens into a back-up tank. The back-up tank comprises an overflow connected to the main tank of the main fluid circuit and comprises a low-flow oil distribution circuit.

Document FR 3 045 764 describes a fluid system provided with a main fluid circuit having a main tank and a back-up fluid circuit having a secondary tank.

Documents EP 3 109 414 A1, U.S. Pat. No. 4,976,335 A, US 2016/305284 A1, and EP 3 418 192 A1 are also known.

SUMMARY

The object of the present disclosure is therefore to propose an innovative method and fluid system for lubricating a mechanical system, the fluid system being provided with a main fluid circuit and a back-up fluid circuit cooperating with the same spraying circuit and having the aim of identifying and estimating the current operating mode of the fluid system.

The disclosure therefore relates to a method for monitoring a fluid system for lubricating a mechanical system. Said fluid system comprises a tank containing a lubricating fluid inside a casing of the mechanical system, said fluid system comprising a spraying circuit provided with at least one sprinkler, said fluid system comprising a main fluid circuit extending from the tank to the spraying circuit, said fluid system comprising a back-up fluid circuit extending from the tank and joining said spraying circuit, for example downstream of the main fluid circuit in the direction of flow of the lubricating fluid, said back-up fluid circuit comprising a back-up check valve configured to be either in a closed state preventing said lubricating fluid from flowing or in an open state allowing said lubricating fluid to flow from the tank to the spraying circuit, said back-up fluid circuit being dimensioned such that the back-up check valve is in the closed state in a nominal operating mode.

Such a method comprises a monitoring phase comprising the following steps:
- detection of a malfunction by monitoring at least one monitoring parameter, said malfunction making the main fluid circuit inoperative, the fluid system operating in a degraded operating mode or indeed being inoperative in the presence of such a malfunction;
- detection that the back-up check valve is in said open state or said closed state;
- generation of a first alert in the presence of said detection of a malfunction and said detection that the back-up check valve is in said open state; and
- generation of a second alert different from the first alert in the presence of said detection of a malfunction and said detection that the back-up check valve is in said closed state.

The expression "in the presence of said detection of a malfunction and said detection that the back-up check valve is in said open state" means that the first alert is issued when a malfunction making the main fluid circuit inoperative is detected and the back-up check valve is in said open state. The fluid system is then in a degraded operating mode.

The expression "in the presence of said detection of a malfunction and said detection that the back-up check valve is in said closed state" means that the second alert is issued when a malfunction making the main fluid circuit inoperative is detected and the back-up check valve is in said closed state. The fluid system is then inoperative.

The expression "making the main fluid circuit inoperative" means that the main fluid circuit is no longer able to supply the spraying circuit with the lubricating fluid.

Such a malfunction may result from a lubricating fluid leak, a failure in a pump of the main fluid circuit, a blocked pipe in the main fluid circuit, a clogged valve, etc.

The spraying circuit may therefore comprise, for example, a distribution section provided with at least one sprinkler, for example located in the mechanical system to be lubricated, and possibly a filter, for example, accompanied by a bypass line. Moreover, the spraying circuit may comprise, for example, a first section hydraulically connecting the distribution section to the back-up check valve. Moreover, the spraying circuit may comprise, for example, a second section hydraulically connecting, for example upstream of the first section, the distribution section to the main fluid circuit and possibly to a main check valve of the main fluid circuit.

Consequently, during the nominal operating mode, the spraying circuit is supplied with lubricating fluid by the main fluid circuit. Such a lubricating fluid may be referred to as "lubricating and/or cooling fluid" and may comprise a liquid and, in particular, oil.

In this context, the method of the disclosure comprises a step of detecting a malfunction making the main fluid circuit inoperative. When such a malfunction is detected, the fluid system is effectively inoperative or in a degraded operating mode during which an alert is generated. The nature of the alert depends on the state of the back-up check valve.

If the fluid system has such a malfunction and if the back-up check valve is open or opens, a first alert is issued. This first alert means that the back-up fluid circuit is operative because the back-up check valve is open. The mechanical system is therefore lubricated via the back-up fluid circuit.

However, if the fluid system has such a malfunction and if the back-up check valve is closed or becomes closed, a second alert is generated. This second alert means that the back-up fluid circuit is inoperative because the back-up check valve is closed. The mechanical system is therefore no longer lubricated.

The first alert may be in the form of a visual and/or audible and/or haptic alert. The second alert may be in the form of a visual and/or audible and/or haptic alert. The first alert and the second alert may be in different forms so as to be distinguished from each other. For example, the first alert is generated by illuminating a light-emitting diode or by displaying a series of characters and the second alert is generated by illuminating another light-emitting diode or by displaying another series of characters.

The method can thus identify the current operation of the fluid system. Indeed, this method makes it possible to identify that the main fluid circuit is no longer supplying lubricating fluid to the spraying circuit and to identify if the back-up fluid circuit has taken over, albeit at a reduced level. The disclosure makes it possible, in particular, to distinguish between a scenario in which the back-up fluid circuit is supplying a very small amount of oil to the sprinklers, the back-up check valve then being open, and a scenario in which the back-up fluid circuit is only drawing in air.

In an aircraft, a pilot may, for example, deduce a permitted flight time from this, depending on the situation. By way of illustration, a pilot may need to quickly carry out a forced landing if the mechanical system is no longer lubricated or may have more time to land the aircraft in good conditions if the back-up fluid circuit is operating. The method of the disclosure makes it possible to reliably identify the situation in order to improve the safety of the flight.

Moreover, the step of determining if the back-up fluid circuit is active or inactive is carried out by determining the current state of the back-up check valve. For example, the position of a movable member of the back-up check valve is evaluated with a conventional sensor, this position conditioning the open or closed state of the back-up check valve. This step may be carried out with a very reliable sensor.

For example, the back-up check valve may comprise a piston or equivalent that is able to move in translation inside a chamber in order to close or open a hydraulic passage of this back-up check valve. An end-of-travel sensor, for example, may be activated by the piston when this piston closes said passage and positions the back-up check valve in its closed state. Alternatively, or additionally, a position sensor may be used. Consequently, the method can, at least for this step, dispense with a pressure sensor measuring a pressure of the lubricating fluid, and can help obtain a reliable monitoring system.

The method may comprise one or more of the following features.

According to a first embodiment of the detection of a malfunction, said at least one monitoring parameter may be a pressure in said spraying circuit, said detection of a malfunction by monitoring at least one monitoring parameter comprising a step of detecting, with a pressure sensor, that said pressure is lower than a predetermined pressure threshold.

Indeed, and regardless of the embodiment, the main fluid circuit may be dimensioned in order for the pressure of the lubricating fluid in the spraying circuit to be higher than the pressure reached when the back-up fluid circuit is active, i.e., when the back-up check valve is in the open state. Similarly, the back-up check valve is dimensioned to be closed under the effect of the pressure of the lubricating fluid injected into the spraying circuit by the main fluid circuit during the nominal operating mode.

Thus, during the nominal operating mode, the monitoring parameter has a first value substantially equivalent to the pressure of the lubricating fluid at the outlet of the main fluid circuit.

When the main fluid circuit becomes inoperative, the fluid system switches to the degraded or inoperative operating mode, depending on the nature of the malfunction. If the back-up check valve opens, the monitoring parameter has a second value lower than the first value and substantially equivalent to the pressure of the lubricating fluid at the outlet of the back-up fluid circuit. If the back-up check valve closes, for example when the level of the lubricating fluid in the tank drops below the suction inlet of a pump of the back-up fluid circuit, the monitoring parameter has a third value lower than the second value.

Therefore, comparing a pressure measured in the spraying circuit to a predetermined pressure threshold can make it possible to determine if the main fluid circuit is defective. For example, the predetermined pressure threshold may be less than or equal to the first value, and greater than or equal to the second value.

Moreover, said main fluid circuit may comprise a main check valve configured to be either in a closed state or in an open state allowing said lubricating fluid to pass from the tank to the spraying circuit.

The first embodiment may be applied in the presence of such a main check valve.

However, according to a second embodiment of the detection of a malfunction, said at least one monitoring parameter may indicate the open or closed state of the main check valve, said detection of a malfunction by monitoring at least one monitoring parameter comprising a step of detecting that said main check valve is in the closed state.

In the nominal operating mode, the main check valve must be open. If the main check valve is in its closed state, the main fluid circuit is no longer operative. The state of the main check valve may be evaluated in a conventional manner, for example according to one of the methods described above.

For safety reasons, the first embodiment and the second embodiment can be combined. A malfunction of the main fluid circuit is thus reported if said main check valve is in the closed state and if a pressure in the spraying circuit is lower than a predetermined pressure threshold.

Regardless of the embodiment, said method may comprise a step of detecting that the mechanical system is operating, said monitoring phase being implemented when the mechanical system is operating.

According to this possibility, the monitoring phase is undertaken only when the mechanical system is operating in order to prevent an alert being issued when the mechanical system is started up. For example, the step of detecting that the mechanical system is operating may include measuring a speed of movement of a movable member of the mechanical system, the monitoring phase being initiated when this movable member is moving at a speed higher than a speed threshold.

Alternatively, the monitoring phase is undertaken after a predetermined period of time following start-up or depending on another criterion and, for example, in response to an order from another system.

Alternatively, the monitoring phase is undertaken at start-up.

According to another aspect compatible with those set out above, since said mechanical system may be arranged in an aircraft, said first alert may indicate permission to fly for a first period of time and the second alert may indicate permission to fly for a second period of time shorter than the first period of time.

For example, the first alert may indicate permission to fly for several tens of minutes, for example a minimum of thirty minutes, by way of illustration. Conversely, the second alert may indicate permission to fly for several minutes and, for example, a maximum of fifteen minutes.

In addition to a method, the disclosure relates to a fluid system applying this method.

Such a fluid system comprises a tank containing a lubricating fluid inside a casing of the mechanical system, said fluid system comprising a spraying circuit, said fluid system comprising a main fluid circuit extending from the tank to the spraying circuit provided with at least one sprinkler, said fluid system comprising a back-up fluid circuit extending from the tank and joining said spraying circuit, for example downstream of the main fluid circuit, said back-up fluid circuit comprising a back-up check valve configured to be either in a closed state preventing said lubricating fluid from flowing or in an open state allowing said lubricating fluid to flow from the tank to the spraying circuit, said back-up fluid circuit being dimensioned such that the back-up check valve is in the closed state in a nominal operating mode.

Moreover, said fluid system is configured to apply the method of the disclosure, said fluid system comprising at least one malfunction sensor for carrying out said detection of a malfunction, said fluid system having a back-up state sensor configured to detect that the back-up check valve is in said open state or said closed state, the fluid system having an alerter in communication with the back-up state sensor and the malfunction sensor, the alerter being configured to carry out said generation of the first alert and said generation of the second alert.

According to the first embodiment, said at least one malfunction sensor may comprise a pressure sensor emitting a pressure signal that varies depending on a pressure in said spraying circuit, said pressure signal being transmitted to the alerter.

According to the second embodiment, said main fluid circuit may comprise a main check valve configured to be either in a closed state or in an open state allowing said lubricating fluid to flow from the tank to the spraying circuit, said at least one malfunction sensor possibly comprising a main state sensor configured to detect that the main check valve is in said open state or said closed state.

According to another possibility, the fluid system may comprise a malfunction sensor of the pressure sensor type and a main state sensor configured to detect that the main check valve is in said open state or said closed state.

According to another aspect compatible with those set out above, said fluid system may comprise an operation sensor for detecting if the mechanical system is operating.

In addition to a fluid system, the disclosure relates to an assembly provided with a mechanical system having at least one element to be lubricated and such a fluid system for lubricating said at least one element to be lubricated.

For example, said mechanical system may be a gearbox.

For example, said spraying circuit may extend partly inside the mechanical system and partly outside the mechanical system.

For example, said back-up check valve may open on the spraying circuit.

The disclosure also relates to a vehicle comprising such an assembly. For example, the vehicle may be a rotorcraft provided with a rotor rotated by the mechanical system.

BRIEF DESCRIPTION OF THE DRAWINGS

The disclosure and its advantages appear in greater detail in the context of the following description of embodiments given by way of illustration and with reference to the accompanying figures, in which:

FIG. 1 is a diagram showing an assembly having a mechanical system of a vehicle and a fluid system according to the disclosure;

FIG. 2 is a logic diagram showing the method of the disclosure;

DETAILED DESCRIPTION

Figure 3:
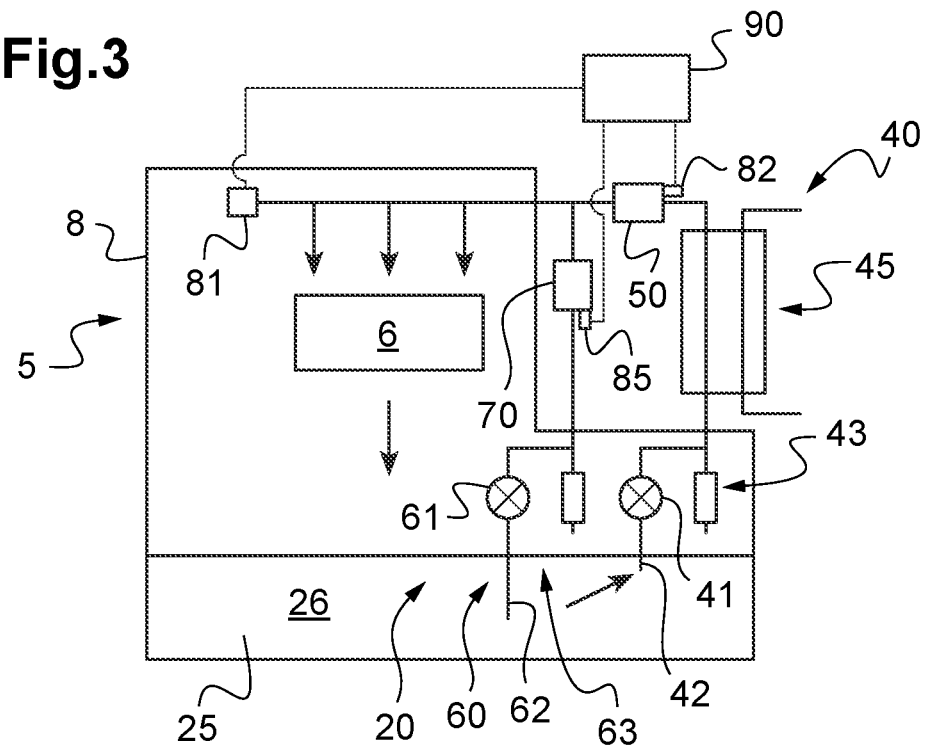
FIG. 3 is a diagram showing a fluid system according to the disclosure in a nominal operating mode.

Elements present in more than one of the figures are given the same references in each of them.

FIG. 1 shows an assembly 4 having a mechanical system 5. This mechanical system 5 may be arranged inside various structures and, for example, inside a vehicle and possibly inside an aircraft 2, according to the example shown. The mechanical system 5 may be a gearbox 7.

For example, the mechanical system 5 is arranged inside a rotorcraft in order to rotate, in particular, a rotor 3, for example via an output rotor mast 9. Such a rotor 3 may be a main rotor of a helicopter, a rotor helping control the yaw movement, a propeller, etc.

Regardless of the nature of the mechanical system 5 and its arrangement, this mechanical system 5 comprises at least one element 6 to be lubricated and/or to be cooled, arranged in a casing 8. In particular, such an element 6 may comprise a gear comprising at least one toothed wheel and a pinion meshed with the toothed wheel. The casing 8 may comprise a plurality of sub-assemblies that together delimit a chamber in which the element or elements 6 are arranged.

In order to lubricate and/or cool the element or elements 6 arranged inside INT the mechanical system 5, the assembly 4 comprises a fluid system 20.

The fluid system 20 comprises a tank 25 containing a lubricating fluid 26 inside the casing 8. For example, a sub-assembly forming a bottom of the casing 8 forms at least part of the tank 25. The lubricating fluid 26 may be a lubricating liquid, such as a liquid comprising oil, or any other liquid suitable for lubricating and/or cooling a mechanical element 6.

In order to spray the lubricating fluid 26 towards the element or elements 6 to be lubricated, the fluid system 20 comprises a spraying circuit 30. The spraying circuit 30 may comprise one or more pipings 31 opening on at least one means for spraying the lubricating fluid 26, referred to as a "sprinkler" 33. Such a sprinkler 33 may be, for example, a nozzle or equivalent, a simple hole in a pipe, a system mixing the lubricating fluid 26 with a gas, etc.

Generally, the term "piping" used above and hereinafter may represent a single pipe or a plurality of pipes fastened to each other.

Moreover, the spraying circuit 30 may comprise a filter unit 32, arranged inside or outside the casing 8. Such a filter unit 32 may comprise a filter and possibly a bypass duct. For example, a filter may open on a piping 31 of the spraying circuit 30. Moreover, a bypass duct, possibly provided with a check valve, may bypass the filter.

Regardless of the aspects above, the fluid system 20 comprises two different circuits for drawing the lubricating fluid 26 from the tank 25 and conveying it into the spraying circuit 30.

The direction of movement of the lubricating fluid 26 is shown by arrows in the figures.

Therefore, the fluid system 20 comprises a main fluid circuit 40 and a back-up fluid circuit 60 that are each in fluid communication with the tank 25 and the spraying circuit 30. The expressions "main" and "back-up" are used to distinguish between components of the main fluid circuit 40 and the back-up fluid circuit 60 respectively.

For example, the spraying circuit 30 comprises a distribution section 36 provided with one or more sprinklers 33. This distribution section 36 extends inside INT the mechanical system 5 and outside EXT the mechanical system 5, or indeed also inside INT the mechanical system 5. Moreover, the spraying circuit 30 may comprise, for example, a first section 34 hydraulically connecting the distribution section 36 to the back-up fluid circuit 60 and a second section 35 hydraulically connecting the distribution section 36 to the main fluid circuit 40. The first section 34 and/or the second section 35 may also extend, for example but not exclusively, outside EXT the mechanical system 5.

According to another aspect, the main fluid circuit 40 may be provided with a main pump 41 that has a main suction inlet 42 submerged, under normal conditions, in the lubricating fluid 26 present in the tank 25. For example, the main pump 41 is provided with a main suction strainer that delimits and/or defines this main suction inlet 42. Moreover, the main suction inlet 42 may be separated from the bottom 6 of the tank by a first height.

The main pump 41 thus draws the lubricating fluid 26 through its main suction inlet 42 in order to set the lubricating fluid 26 in motion in a main fluid connection 46.

Therefore, the main fluid circuit 40 comprises a main fluid connection 46 provided with at least one piping.

According to the variant, the main fluid connection 46 may open directly on the spraying circuit 30 or via at least one heat exchanger 45 and/or at least one main check valve 50, or indeed at least one filter.

In particular, the main fluid circuit 40 may comprise at least one heat exchanger 45, preferably arranged outside EXT the mechanical system 5. Such a heat exchanger 45 may be a radiator or equivalent blown by air moved by a fan.

In an additional or complementary manner, the main fluid circuit 40 may comprise a main check valve 50. The main check valve 50 is configured to be either in a closed state preventing the lubricating fluid from passing through it or in an open state allowing the lubricating fluid 26 to flow through the main check valve 50 only in a direction of flow from the tank 25 to the spraying circuit 30. In an example given by way of illustration, the main check valve 50 comprises a main passage 53 that can be closed by a main blocking device 51, such as a piston or a ball or equivalent, this main blocking device 51 being pushed towards the main passage 53 by a main elastic return device 52, such as a spring or equivalent.

When not in use, the main elastic return device 52 pushes the main blocking device 51 to close the main passage 53. The main check valve 50 is in a closed state. However, the main elastic return device 52 is calibrated to be compressed under the pressure of the lubricating fluid 26 when the main pump 41 is set in motion, in order to open the main passage 53 and allow lubricating fluid to flow. If applicable, the main check valve 50 may open on the second section 35 of the spraying circuit 30.

The main check valve 50 may, for example, be arranged outside EXT the mechanical system 5, for example for maintenance purposes, and/or may be situated downstream of said at least one heat exchanger 45.

According to the example shown, the main pump 41 is therefore in fluid communication with at least one heat exchanger 45 via the main fluid connection 46. Moreover, the heat exchanger 45 is in fluid communication with the main check valve 50 via a connecting piping, the main check valve 50 opening on the second section 35 of the spraying circuit 30.

The main fluid circuit 40 possibly comprises a main fluid bypass connection 43 for bringing the main fluid connection 46 and the tank 5 into fluid communication upstream of said heat exchanger 27 under specific conditions. For example, the main fluid bypass connection 43 comprises a bypass piping fastened to the main fluid connection 46 and to a main pressure relief valve 44. This main pressure relief valve 44 opens when a threshold pressure is passed in order to allow the lubricating fluid 26 to return into the tank 25 if the main fluid connection 46 or the heat exchanger 45 are clogged or the main check valve 50 is stuck in the closed state.

The main fluid circuit 40 may possibly comprise at least one filter unit, for example of the type described above. For example, a filter unit may be interposed between the heat exchanger(s) 45 and the main pump 41.

Regardless of the embodiment of the main fluid circuit 40 and the other aspects described above, the fluid system 20 comprises a back-up fluid circuit 60. This back-up fluid circuit 60 may be provided with a back-up pump 61 having a back-up suction inlet 62.

For example, the back-up pump 61 is provided with a secondary suction strainer that delimits and/or defines this back-up suction inlet 62. Moreover, the back-up suction inlet 62 may be separated from the bottom of the tank by a second height that may be less than the first height of the main pump 41. In other words, the back-up pump 61 may draw the lubricating fluid 26 from the tank 25 more deeply than the main pump 41.

The back-up suction inlet 62 may possibly rest on the bottom of the tank 25.

The back-up pump 61 thus draws the lubricating fluid 26 through this back-up suction inlet 62 in order to convey it into a back-up fluid connection 65.

According to another aspect, for example, the main pump 41 and the back-up pump 61 operate at the same time in normal conditions, i.e., when there is no failure. For example, the main pump 41 and the back-up pump 61 are both set in motion by a wheel or a pinion of the mechanical system 5. Thus, when the mechanical system 5 is moving, the main pump 41 and the back-up pump 61 are also set in motion.

Moreover, the back-up fluid circuit 60 comprises a back-up fluid connection 65 provided with at least one piping. The back-up fluid connection 65 opens on a back-up check valve 70 configured to be either in a closed state preventing the lubricating fluid from passing through it or in an open state allowing the lubricating fluid 26 to flow through it only in a direction of flow from the tank 25 to the spraying circuit 30. If applicable, the back-up check valve 70 may open on the second section 35 of the spraying circuit 30.

In an example given by way of illustration, the back-up check valve 70 comprises a back-up passage 73 that can be closed by a back-up blocking device 71, such as a piston or a ball or equivalent, this back-up blocking device 71 being pushed towards the back-up passage 73 by a back-up elastic return device 72, such as a spring or equivalent.

When not in use, the back-up elastic return device 72 pushes the back-up blocking device 71 to close the back-up passage 73. However, the back-up elastic return device 72 is calibrated to be compressed under the pressure of the lubricating fluid 26 when the back-up pump 61 is operating while the main fluid circuit is inoperative.

Moreover, the possible elastic return device, the main fluid circuit 40 and the back-up fluid circuit 60 are dimensioned such that the back-up check valve 70 is in the closed state in a nominal operating mode. During the nominal operating mode, the fluid system is dimensioned such that the back-up check valve 70 remains in the closed state under the effect of the elastic return device and the pressure of the lubricating fluid at the outlet of this back-up check valve 70, the outlet being i.e., considered in a direction from the tank towards the spraying circuit.

The back-up check valve 70 may, for example, be arranged outside EXT the mechanical system 5, for example for maintenance purposes.

The back-up fluid circuit 60 may also comprise a filter unit between the back-up pump 61 and the back-up check valve 70.

The back-up fluid circuit 60 possibly comprises a back-up fluid bypass connection 63 for bringing the back-up fluid circuit 60 and the tank 25 into fluid communication upstream of the back-up check valve 70 under specific conditions. For example, the back-up fluid bypass connection 63 comprises a bypass piping fastened to the back-up fluid connection 65 and to a back-up pressure relief valve 64. This back-up pressure relief valve 64 opens when a threshold pressure is passed in order to allow the lubricating fluid 26 to return into the tank 25 if the back-up fluid connection 65 is clogged or the back-up check valve 70 is stuck in the closed state.

Moreover, the fluid system 20 comprises a monitoring system for determining its operating state.

The monitoring system comprises an alerter 90 suitable for generating a first alert and a second alert that are different. Each alert may be in the form of a visual alarm, for example emitting a light with a light-emitting diode or equivalent or displaying one or more characters on a screen, an audible alarm, by means of a loudspeaker, and/or a haptic alarm, for example by means of a vibrating unit that vibrates a member held or worn by an individual.

In order to determine if an alert needs to be emitted, the alerter 90 may comprise, for example, a computer having at least one processor and at least one memory, at least one integrated circuit, at least one programmable system, at least one logic circuit, at least one electric circuit, these examples not limiting the scope given to the expression "alerter". The term "processor" may refer equally to a central processing unit (CPU), a graphics processing unit (GPU), a digital signal processor (DSP), a microcontroller, etc.

The monitoring system also comprises a back-up state sensor 85 transmitting a back-up state signal to the alerter 90 via a wired or wireless link. The back-up state sensor 85 is configured to emit a back-up state signal that varies when the back-up check valve 70 switches from the open state to the closed state and vice versa. The back-up state sensor 85 determines if the back-up check valve 70 is open or closed, advantageously by means of a measurement that is not a measurement of the pressure of the lubricating fluid 26.

For example, and by way of illustration, the back-up state sensor 85 comprises an end-of-travel sensor that is pressed, if applicable, by the back-up blocking device 71 when this back-up blocking device 71 closes the back-up passage 73. Any type of sensor that makes it possible to establish the open or closed state of the back-up check valve 70 may be used, and, in particular, a position sensor measuring the position of the back-up blocking device 71, if applicable.

The monitoring system also comprises at least one malfunction sensor 80 for detecting a possible malfunction of the main fluid circuit 40. This malfunction sensor 80 may comprise one or more sensors each emitting an analog or digital malfunction signal to the alerter 90.

For example, a malfunction sensor 80 comprises a pressure sensor 81 emitting an analog or digital pressure signal that varies depending on a pressure in said spraying circuit 30, and in particular of the lubricating fluid 26 in the spraying circuit 30, in the absence of a leak. The pressure sensor 81 may optionally be arranged at the end of the spraying circuit 30.

Additionally, or alternatively, in the presence of a main check valve 50, a malfunction sensor 80 may comprise a main state sensor 82 transmitting a main state signal to the alerter 90 via a wired or wireless link. The main state sensor 82 is configured to emit a main state signal that varies when the main check valve 50 switches from the open state to the closed state and vice versa. The main state sensor 82 determines if the main check valve 50 is open or closed, advantageously by means of a measurement that is not a measurement of the pressure of the lubricating fluid 26.

For example, and by way of illustration, the main state sensor 82 comprises an end-of-travel sensor that is pressed, if applicable, by the main blocking device 51 when this main blocking device 51 closes the main passage 53. Any type of sensor that makes it possible to establish the state of the main check valve 50 may be used, and in particular a position sensor measuring the position of the main blocking device 51, if applicable.

According to another aspect, the fluid system 20 may comprise an operation sensor 95 for detecting if the mechanical system 5 is operating. For example, the operation sensor 95 comprises a speed sensor emitting an analog or digital operating signal that varies depending on a speed of movement of an element 6 of the mechanical system 5. This operating signal is transmitted to the alerter 90 via a wired or wireless link.

The alerter 90 is configured to apply the method according to the disclosure depending on the received signals.

FIG. 2 shows this method. This method comprises a monitoring phase STPB implemented by the alerter 90 for indicating to an individual if the fluid system 20 is faulty and, if applicable, for evaluating the impact of the fault.

The method may optionally comprise a prior step STPA of detecting that the mechanical system 5 is operating. According to this variant, the alerter 90 implements the monitoring phase STPB only when the mechanical system 5 is operating.

Irrespective of this possibility, the monitoring phase STPB comprises a step STPB1 of identifying the current operating mode of the fluid system 20.

This identification step STPB1 comprises a step STPB11 of detecting a malfunction during which a malfunction making said main fluid circuit 40 inoperative is detected by the alerter 90, by monitoring at least one monitoring parameter with the malfunction sensor 80.

According to one example, a monitoring parameter is in the form of a pressure in the spraying circuit 30 measured with a pressure sensor 81. Consequently, said detection of a malfunction by monitoring at least one monitoring parameter comprises a step of detecting that said pressure is lower than a predetermined pressure threshold. Consequently, the alerter 90 detects such a malfunction when the pressure signal transmitted by the pressure sensor 81 indicates a pressure lower than a pressure threshold stored in this alerter 90.

According to one example, a monitoring parameter indicates the open or closed state of the main check valve 50. The detection of a malfunction by monitoring at least one monitoring parameter comprises a step of detecting that said main check valve 50 is in the closed state. Consequently, the alerter 90 detects such a malfunction when the main state signal transmitted by the main state sensor 82 indicates a closed state of the main check valve 50.

The identification step STPB1 also comprises a step STPB12 of detecting that the back-up check valve 70 is in said open state or said closed state. The alerter 90 determines if the back-up check valve 70 is closed or open depending on the back-up state signal transmitted by the back-up state sensor 85.

This detection step STPB12 and the step STPB11 of detecting a malfunction can be carried out at the same time or one after another. For example, the detection step STPB12 may be carried out only if a malfunction has been detected.

Moreover, the monitoring phase STPB comprises an alert step STPB2 implemented when the fluid system 20 is inoperative or operating in a degraded operating mode.

Therefore, the alert step STPB2 comprises a step STPB21 of generating a first alert when a malfunction is detected and the back-up check valve 70 is in said open state, and therefore when the fluid system 20 is operating in a degraded operating mode. However, if the back-up check valve 70 is in said closed state when a malfunction is detected, and therefore when the fluid system 20 is inoperative, the monitoring phase STPB comprises a step STPB22 of generating a second alert different from the first alert.

When the mechanical system 5 is arranged inside an aircraft 2, said first alert may indicate permission to fly for a first period of time and the second alert may indicate permission to fly for a second period of time shorter than the first period of time. For example, the first alert and the second alert are in the form of the corresponding 15-minute or 30-minute time periods, the alerter 90 displaying the appropriate time period.

FIGS. 3 to 6 show the operation of the disclosure.

FIG. 3 shows the fluid system in a nominal operating mode. The main fluid circuit 40 draws the lubricating fluid 26 from the tank 25 and conveys it into the spraying circuit 30. The back-up check valve 70 is in its closed state. For example, the pressure sensor 81 transmits a pressure signal to the alerter 90 indicating a pressure substantially equivalent to the pressure of the lubricating fluid 26 in the main fluid circuit 40. The alerter 90 deduces from this that the fluid system 20 is operating normally, and no alert is issued.

Figure 4:
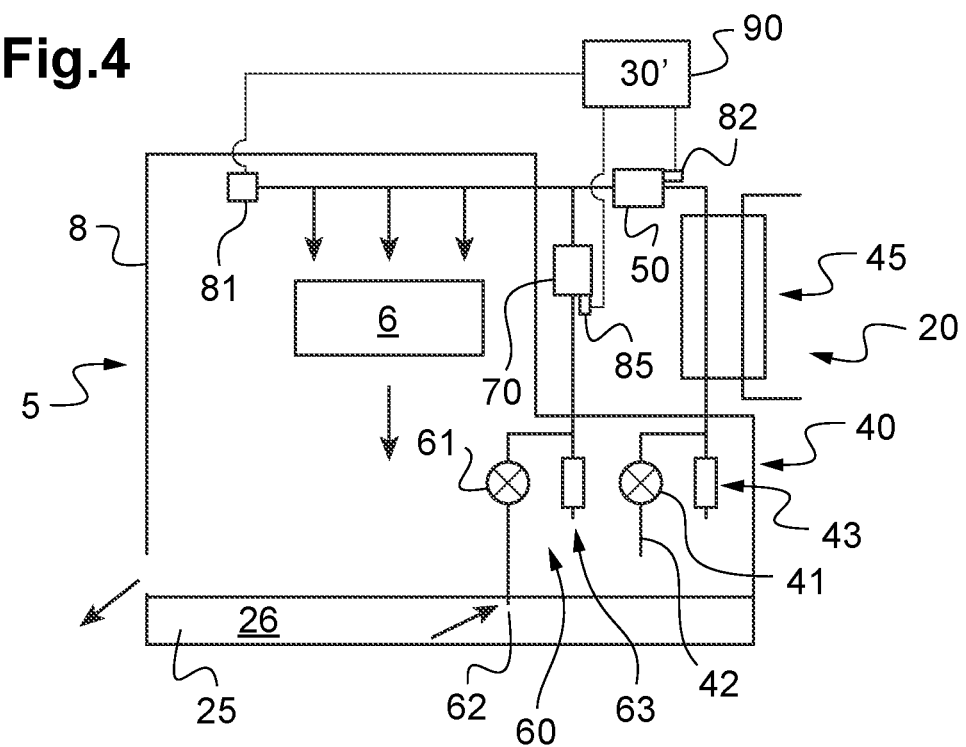
FIG. 4 is a diagram showing a fluid system according to the disclosure in a degraded operating mode as a result of lubricating fluid leaking from the fluid system by force of gravity.

According to FIG. 4, the fluid system 20 has a leak described for convenience as a gravity leak preventing the lubricating fluid 26 from returning into the tank 25. The level of the lubricating fluid 26 drops in the tank 25. When this level drops below the main suction inlet 42 of the main fluid circuit 40, the lubricating fluid 26 no longer flows in the main fluid circuit 40. The main check valve 50 switches to the closed state. Conversely, the back-up check valve 70 opens and supplies the spraying circuit 30. The change of state of the main check valve 50 and/or the measurement made by the pressure sensor 81 allow the alerter 90 to detect a malfunction during the abovementioned step STPB. The back-up check valve 70 being open, following receipt of a back-up state signal emitted by the back-up state sensor 85 indicating this open state of the back-up check valve 70, the alerter 90 emits the first alert, for example synonymous with permission to fly for thirty minutes starting from this point in time.

If the level of the lubricating fluid 26 in the tank 25 drops below the back-up suction inlet 62 of the back-up fluid circuit 60, the lubricating fluid 26 no longer flows in the back-up fluid circuit 60 either. The back-up check valve 70 switches to the closed state. After receiving a back-up state signal emitted by the back-up state sensor 85 indicating this closed state of the back-up check valve 70, the alerter 90 emits the second alert, for example synonymous with permission to fly for fifteen minutes starting from this point in time because the elements 6 of the mechanical system are no longer lubricated.

Figure 5:
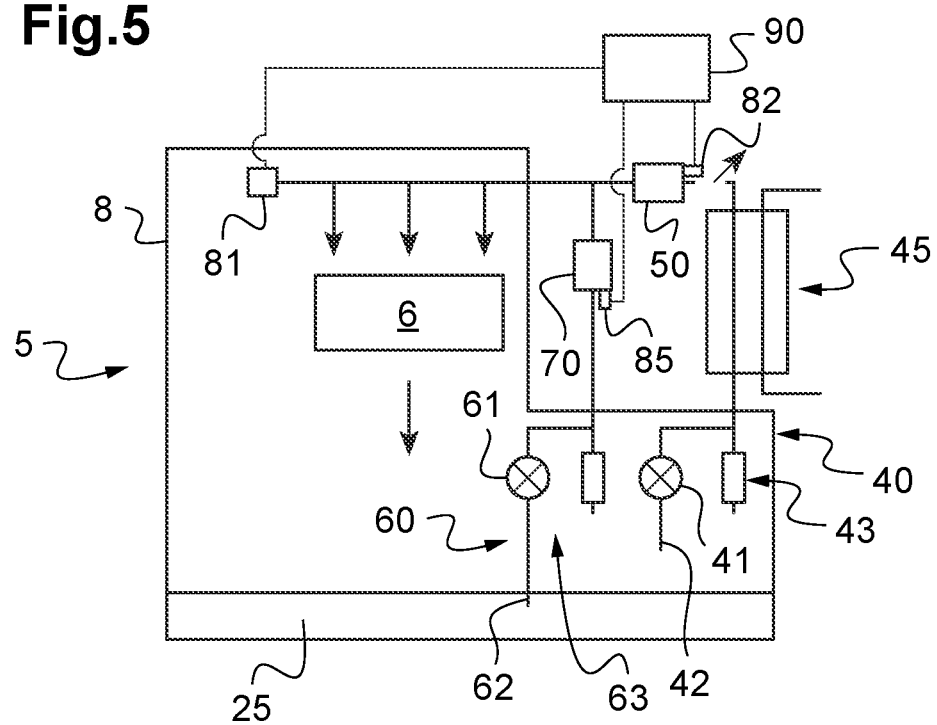
FIG. 5 is a diagram showing a fluid system according to the disclosure in a degraded operating mode as a result of a lubricating fluid leak in the main fluid circuit.

According to FIG. 5, the fluid system 20 has a leak in the main fluid circuit 40 and outside the mechanical system 5. The level of the lubricating fluid 26 drops in the tank 25. The operation described above also applies in this case.

Figure 6:
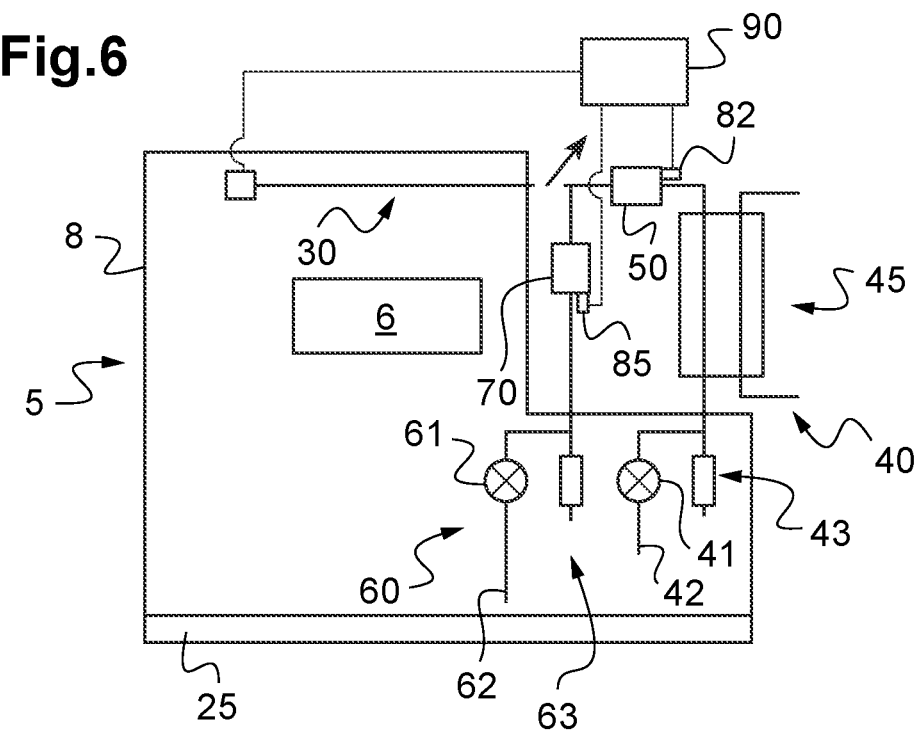
FIG. 6 is a diagram showing a fluid system according to the disclosure in a degraded operating mode as a result of a lubricating fluid leak in the spraying circuit.

According to FIG. 6, the fluid system 20 has a leak in the spraying circuit 30. Consequently, the back-up check valve 70 opens.

In the presence of a pressure-type monitoring parameter measured by the pressure sensor 81, the alerter 90 emits the first alert. In the presence of a monitoring parameter of the type indicating the open or closed state of the main check valve 50, the first alert is issued when the level of lubricating fluid 26 in the tank 25 drops below the main suction inlet 42 of the main fluid circuit 40.

When the level of the lubricating fluid 26 in the tank 25 drops below the back-up suction inlet 62 of the back-up fluid circuit 60, the lubricating fluid 26 no longer flows in the back-up fluid circuit 60 either. The back-up check valve 70 switches to the closed state. The alerter 90 emits the second alert, for example synonymous with permission to fly for fifteen minutes starting from this point in time because the elements 6 of the mechanical system are no longer lubricated via the spraying circuit 30.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

What is claimed is:

1. A method for monitoring a fluid system for lubricating a mechanical system, the fluid system comprising a tank containing a lubricating fluid inside a casing of the mechanical system, the fluid system comprising a spraying circuit provided with at least one sprinkler, the fluid system comprising a main fluid circuit extending from the tank to the spraying circuit, the fluid system comprising a back-up fluid circuit extending from the tank and joining the spraying circuit, the back-up fluid circuit comprising a back-up check valve configured to be either in a closed state preventing the lubricating fluid from flowing or in an open state allowing the lubricating fluid to flow from the tank to the spraying circuit, the back-up fluid circuit being dimensioned such that the back-up check valve is in the closed state in a nominal operating mode, the method comprising a monitoring phase comprising the following steps:
   detection of a malfunction by monitoring at least one monitoring parameter, the malfunction making the main fluid circuit inoperative; and
   detection that the back-up check valve is in the open state or the closed state;
   wherein the monitoring phase comprises the following steps:
   generation of a first alert in the presence of the detection of the malfunction and the detection that the back-up check valve is in the open state; and
   generation of a second alert different from the first alert in the presence of the detection of the malfunction and the detection that the back-up check valve is in the closed state.

2. The method according to claim 1
   wherein the at least one monitoring parameter is a pressure in the spraying circuit, the detection of the malfunction by monitoring at least one monitoring parameter comprising a step of detecting, with a pressure sensor, that the pressure is lower than a predetermined pressure threshold.

3. The method according to claim 1
   wherein the main fluid circuit comprises a main check valve configured to be either in a closed state or in an open state allowing the lubricating fluid to flow from tank to the spraying circuit, the at least one monitoring parameter indicating the open or closed state of the main check valve, the detection of the malfunction by monitoring at least one monitoring parameter comprising a step of detecting that the main check valve is in the closed state.

4. The method according to claim 1
   wherein the method comprises a step of detecting that the mechanical system is operating, the monitoring phase being implemented when the mechanical system is operating.

5. The method according to claim 1
   wherein the mechanical system is arranged inside an aircraft, the first alert indicating permission to fly for a first period of time and the second alert indicating permission to fly for a second period of time shorter than the first period of time.

6. A fluid system comprising a tank containing a lubricating fluid inside a casing of a mechanical system, the fluid system comprising a spraying circuit, the fluid system comprising a main fluid circuit extending from the tank to the spraying circuit provided with at least one sprinkler, the fluid system comprising a back-up fluid circuit extending from the tank and joining the spraying circuit, the back-up fluid circuit comprising a back-up check valve configured to be either in a closed state preventing the lubricating fluid from flowing or in an open state allowing the lubricating fluid to flow from the tank to the spraying circuit, the back-up fluid circuit being dimensioned such that the back-up check valve is in the closed state in a nominal operating mode, the fluid system comprising at least one malfunction sensor for carrying out the detection of a malfunction, the fluid system having a back-up state sensor configured to detect that the back-up check valve is in the open state or the closed state, the fluid system having an alerter in communication with the back-up state sensor and the malfunction sensor;

wherein the fluid system is configured to apply the method according to claim 1, the alerter being configured to carry out the generation of the first alert and the generation of the second alert.

7. The fluid system according to claim 6
   wherein the malfunction sensor comprises a pressure sensor emitting a pressure signal that varies depending on a pressure in the spraying circuit, the pressure signal being transmitted to the alerter.

8. The fluid system according to claim 6
   wherein the main fluid circuit comprises a main check valve configured to be either in a closed state or in an open state allowing the lubricating fluid to flow from the tank to the spraying circuit, the malfunction sensor comprising a main state sensor configured to detect that the main check valve is in the open state or the closed state.

9. The fluid system according to claim 6
   wherein the fluid system comprises an operation sensor for detecting if the mechanical system is operating.

10. An assembly provided with a mechanical system having at least one element to be lubricated and a fluid system for lubricating the at least one element to be lubricated;
    wherein the fluid system is according to claim 6.

11. The assembly according to claim 10
    wherein the mechanical system is a gearbox.

12. The assembly according to claim 10
    wherein the spraying circuit extends partly inside the mechanical system and partly outside the mechanical system.

13. The assembly according to claim 10
    wherein the back-up check valve opens on the spraying circuit.

14. A vehicle comprising the assembly
    wherein the assembly is according to claim 10.

15. The vehicle according to claim 14
    wherein the vehicle is a rotorcraft provided with a rotor rotated by the mechanical system.

* * * * *